(12) United States Patent
Lasse

(10) Patent No.: US 7,448,593 B2
(45) Date of Patent: Nov. 11, 2008

(54) BUTTERFLY VALVE HAVING FLANGES FORMING A POSITIVE LOCK

(75) Inventor: Korf Madsen Lasse, Odense S (DK)

(73) Assignee: Alfa laval LKM A/S, Kolding (DK)

( * ) Notice: Subject to any disclaimer, the term of this patent is extended or adjusted under 35 U.S.C. 154(b) by 146 days.

(21) Appl. No.: 10/578,165

(22) PCT Filed: Apr. 21, 2004

(86) PCT No.: PCT/EP2004/004200

§ 371 (c)(1),
(2), (4) Date: May 4, 2006

(87) PCT Pub. No.: WO2004/102047

PCT Pub. Date: Nov. 25, 2004

(65) Prior Publication Data

US 2007/0023727 A1    Feb. 1, 2007

(30) Foreign Application Priority Data

May 16, 2003   (DE) .............................. 103 22 280

(51) Int. Cl.
*F16K 1/22* (2006.01)
(52) U.S. Cl. .................. 251/148; 251/306; 285/365
(58) Field of Classification Search ......... 251/305–308, 251/148; 285/365–367
See application file for complete search history.

(56) References Cited

U.S. PATENT DOCUMENTS

| | | | | |
|---|---|---|---|---|
| 2,766,999 A | * | 10/1956 | Watts et al. | ............... 285/367 |
| 3,129,920 A | | 4/1964 | Stillwagon | |
| 3,369,791 A | * | 2/1968 | Ahrens et al. | ............. 251/148 |
| 3,534,939 A | * | 10/1970 | Frazier et al. | ............. 251/306 |
| 3,737,144 A | * | 6/1973 | Duncan | ................. 285/365 |
| 3,737,179 A | * | 6/1973 | White, Jr. | ................. 285/367 |
| 3,874,631 A | * | 4/1975 | Osthues | .................. 251/148 |
| 4,111,395 A | * | 9/1978 | Sheppard | ................ 251/306 |

(Continued)

FOREIGN PATENT DOCUMENTS

DE     15 50 499 B     3/1972

(Continued)

OTHER PUBLICATIONS

International Search Report.

*Primary Examiner*—John Bastianelli
(74) *Attorney, Agent, or Firm*—Collard & Roe, P.C.

(57) ABSTRACT

A butterfly valve includes an annular, elastic sealing element that encloses an axial opening, a valve disk which is disposed inside the axial opening so as to be rotatable transversal to the axial direction, a device for rotating the valve disk between closed and open positions in order to control a fluid flow through the opening, and at least two valve housing parts that enclose the sealing element in an annular manner and embrace two flanges which are connected to an inlet and an outlet. Conical contact areas of the flanges and/or the valve housing parts cooperate in such a way that the flanges are axially pressed in a sealing fashion against the sealing element by means of the valve housing parts in the operationally mounted state. The flanges are respectively connected in a rigid and positive manner to a couple of clamps.

8 Claims, 6 Drawing Sheets

U.S. PATENT DOCUMENTS

Figure 1:
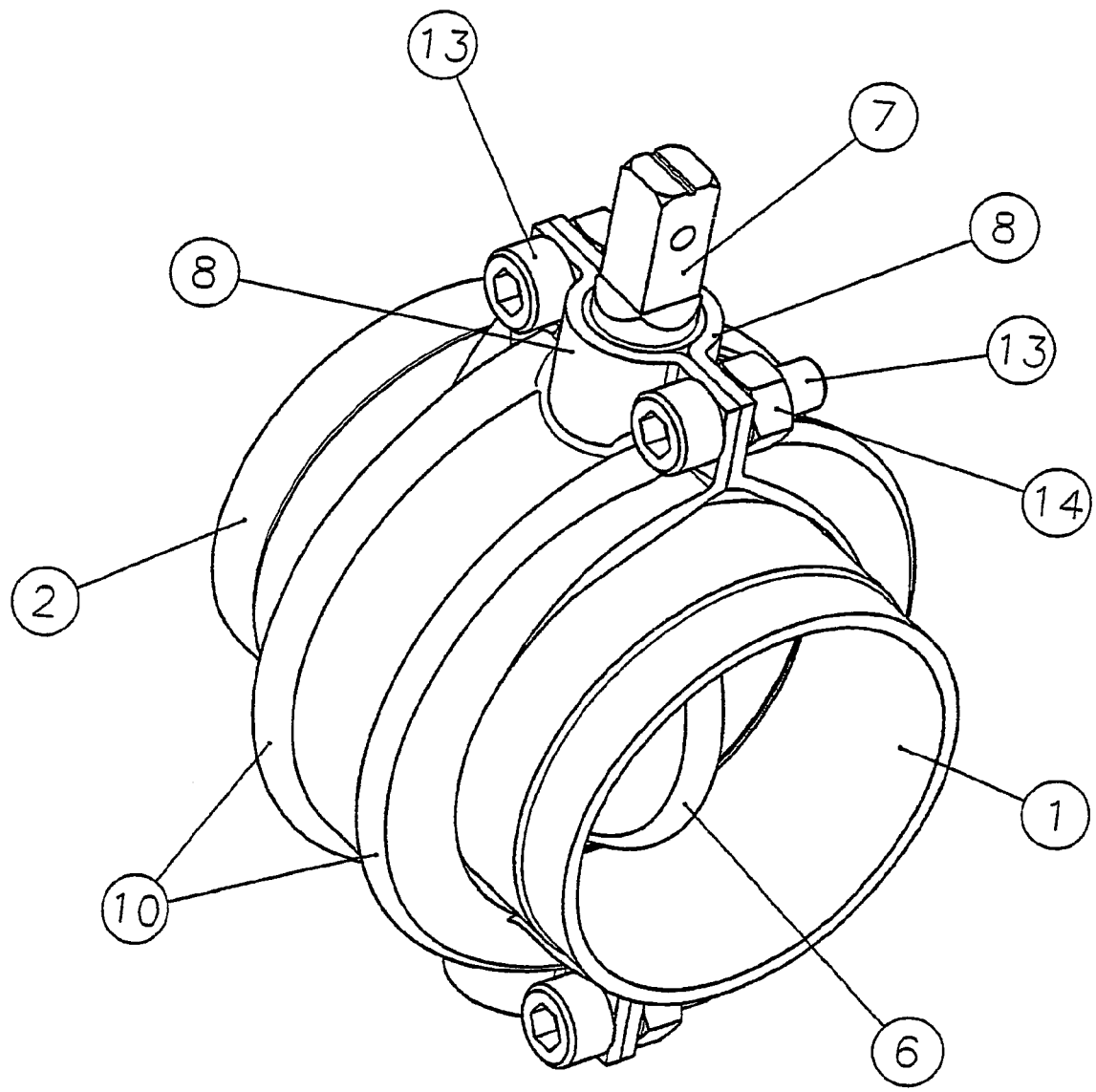

| | | | | |
|---|---|---|---|---|
| 4,148,458 A | * | 4/1979 | Holtgraver | 251/306 |
| 4,653,725 A | | 3/1987 | Nanz et al. | |
| 5,018,548 A | * | 5/1991 | McLennan | 251/306 |
| 5,080,400 A | * | 1/1992 | Adamek et al. | 285/367 |
| 5,236,003 A | * | 8/1993 | Habicht | 251/148 |
| 5,482,252 A | * | 1/1996 | Kamezawa | 251/306 |

FOREIGN PATENT DOCUMENTS

| | | |
|---|---|---|
| DE | 25 36 995 A | 3/1977 |
| EP | 0 683 340 A | 11/1995 |
| FR | 1 181 609 A | 6/1959 |

* cited by examiner

BUTTERFLY VALVE HAVING FLANGES FORMING A POSITIVE LOCK

CROSS REFERENCE TO RELATED APPLICATIONS

Applicant claims priority under 35 U.S.C. §119 of German Application No. 103 22 280.4 filed May 16, 2003. Applicant also claims priority under 35 U.S.C. §365 of PCT/EP2004/004200 filed Apr. 21, 2004. The international application under PCT article 21(2) was not published in English.

The invention relates to a throttle flap valve having an essentially ring-shaped, elastic seal element that surrounds an axial opening, having a valve disk disposed to rotate in the axial opening, crosswise to the axial direction, having means for turning the valve disk between the open and the closed positions, to control a flow of fluid through the opening, having at least two valve housing parts that essentially surround the seal element in ring shape, which surround two flanges connected with an inflow and an outflow, whereby conical contact surfaces of the flanges and/or the valve housing parts work together in such a manner that the flanges are pressed axially against the seal element, forming a seal, by means of the valve housing parts, in the assembled state ready for operation.

Such a throttle flap valve is known, for example, from DE 15 50 499 B2. In the case of the valve proposed there, two flanges connected with an inflow and an outflow are held together by means of two cheeks. An essentially ring-shaped rubber seal, which surrounds a valve disk, is clamped between the flanges. An axial force that moves the flanges towards one another acts in addition to the radial force when the two cheeks are pressed radially together, as a result of slanted inside surfaces of the cheeks. In the assembled state, ready for operation, the flange end surfaces that clamp the rubber seal in place are connected with the cheeks without being in contact with them. Instead, a connection of the flanges to the checks exists only indirectly, by way of the seal element, as well as on the back surface that faces away from the rubber seal. The connection is therefore elastic in the axial direction, along the valve.

It is a disadvantage in the case of such throttle flap valves that when axial forces act on the valve, for example due to vibrations in preceding and/or subsequent system parts, the force that holds the rubber seal together varies, by way of the flanges. The transfer of the variable axial forces on the rubber seal that occur due to vibrations, for example, can result in non-uniform wear of the rubber seal, in disadvantageous manner. This in turn can result in the disadvantage of the seal becoming leaky.

Another disadvantage of the known throttle flap valve is the relatively great use of material resulting from the use of essentially solid cheeks for assembling the valve. A great use of material is undesirable both for weight reasons and for cost reasons.

It is therefore the task of the invention to propose a throttle flap valve of the type stated initially, in which the axial forces that act on the seal element are essentially independent of the operating state of the system, and which is designed, in particular, to save material.

The invention accomplishes this task in surprisingly simple manner in that the flanges are rigidly connected with the valve housing parts, in each instance, with a positive lock. By means of the rigid connection of the flanges with the surrounding valve housing parts, the advantageous result is achieved that the rubber seal is pressed together with a constant force, determined exclusively by the design of the valve housing parts and of the rubber seal, in the assembled state ready for operation. Axial forces from the preceding or subsequent system parts are transferred to the valve housing parts, and from them to the opposite flange, by the flange end surface, in each instance, by way of the rigid connection with the valve housing parts, with the advantage that the force on the rubber seal is not influenced thereby.

In a particularly advantageous embodiment of the invention, the valve housing parts are configured as two clamp halves. This has the advantage that only two individual parts are needed for assembly of the valve. Furthermore, the use of two clamp halves has the advantage of allowing assembly of the valve in surprisingly material-saving manner. However, it is particularly advantageous that the valve can be taken apart while in place, using the clamp halves, since it is not necessary to pull the flanges apart in order to remove the seal.

A special configuration of the invention provides that the inside surfaces of the clamp halves that are in contact with the seal element have two ring-shaped depressions that surround the flanges. The advantage of this embodiment is that in this manner, the radial holding force is also broken down into an axial holding force component by way of the clamp halves, to axially clamp the seal in between the flanges.

It is particularly advantageous if the depressions are beveled at the edges in inside surfaces of the clamp halves, since in this way, particularly simple assembly is possible, in that the two flanges connected with an inflow and an outflow are drawn together axially by drawing the clamp halves together in the radial direction, in accordance with the configuration of the bevel. In this manner, the radial contact pressure that is decisive for the seal, and the axial contact pressure on the seal that is exerted by way of the flange end surfaces are increased step by step, until the flange end surfaces touch the clamp, advantageously at the same time.

Another advantageous embodiment of the invention results if the flanges are configured to narrow conically towards the outside, since in this manner, particularly simple assembly is advantageously possible, in that the two flanges are drawn together axially by drawing the clamp halves together in the radial direction, in accordance with the special configuration of the conical narrowing. In this manner, the radial contact pressure that is decisive for the seal, and the axial contact pressure that is exerted on the seal by way of the flange end surfaces are increased step by step, advantageously at the same time.

In another special embodiment of the invention, the valve housing parts are configured so that they can be connected by means of screws and nuts. This has the advantage that assembly of the valve on location can be performed in particularly simple manner, without any special tools, even by unqualified personnel. In particular, replacement of the seal on location is advantageously possible in this manner.

A very advantageous embodiment of the invention is obtained wherein the valve housing parts are configured with two ring-shaped recesses that lie radially opposite one another, for accommodating valve disk shafts of the valve disk. In this way, it is advantageously possible to mount valve disk shafts in the valve housing parts. The advantage of this embodiment consists in the fact that the number of components of the valve is small, since the valve housing parts are used, at the same time, to hold the seal, to assemble the valve and, on the basis of the two ring-shaped recesses that lie radially opposite one another, also for mounting and holding the axle of the valve disk. In this manner, material and costs are advantageously saved.

In a special variant of the invention, the means for turning the valve disk is an automatic setting element.

In another variant of the invention, the means for turning the valve disk is a hand wheel.

In a preferred embodiment of the invention, the flanges are shaped to have rotation symmetry. The advantage of this configuration is that a hand wheel or an automatic valve drive can be mounted on the valve in any desired angle orientation. This is advantageous, for example, if the valve is mounted in pipelines that are located in the vicinity of other system elements, and/or if access to the hand wheel or to the automatic valve drive is only possible at specific orientations of the hand wheel or the drive, since any desired orientation can be adjusted with the rotation symmetry of the flange, according to the invention.

The invention will be explained in a preferred embodiment, as an example, making reference to a drawing, whereby additional advantageous details of the figures can be seen in the drawing.

The figures of the drawing show, in detail:

FIG. 1: overall view of an assembled valve according to the invention

Figure 2:
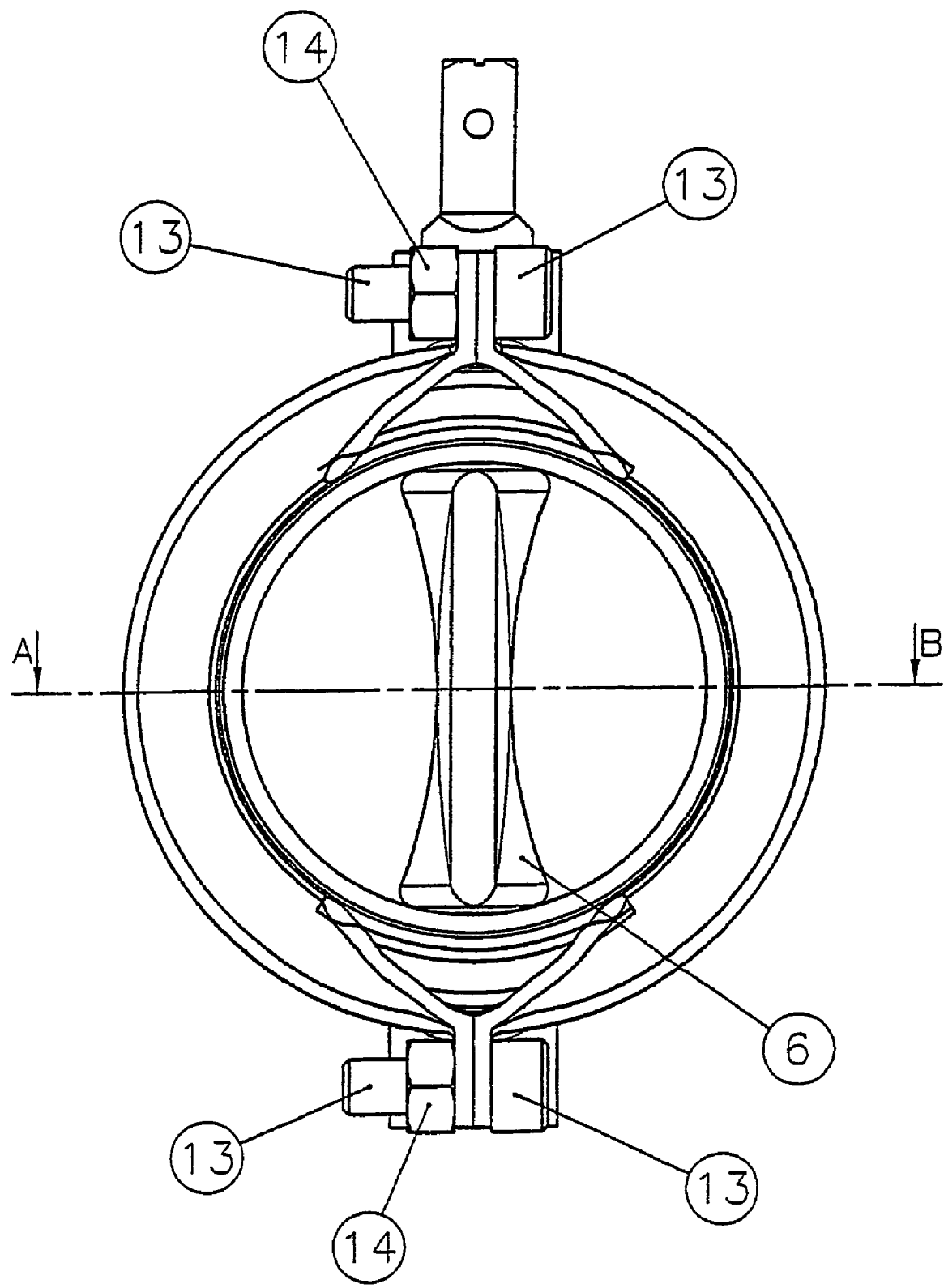
Figure 3:
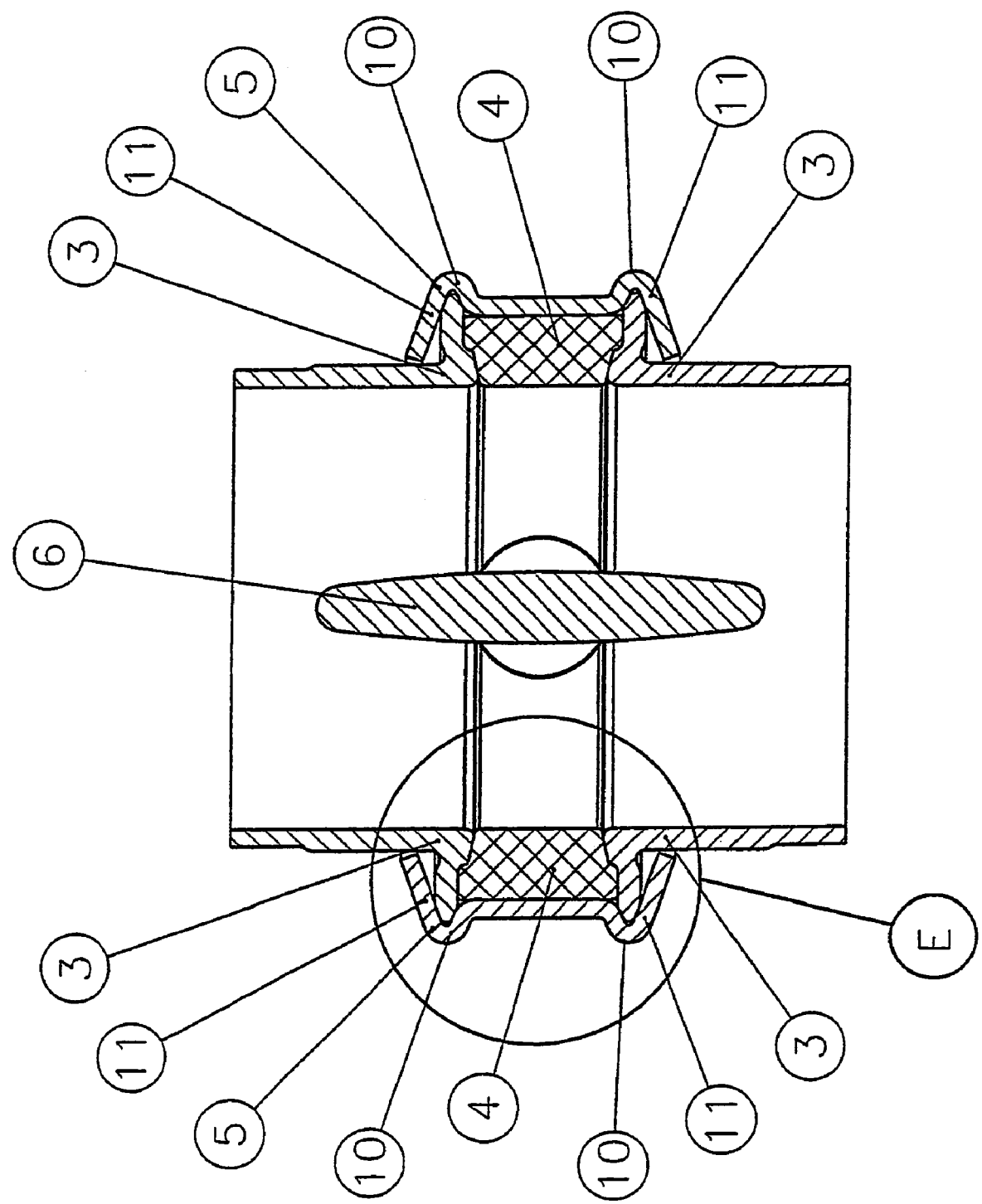

FIG. 2: front view of a valve according to the invention, in the axial direction FIG. 3: axial longitudinal cross-section along the line A-B of FIG. 2

Figure 4:
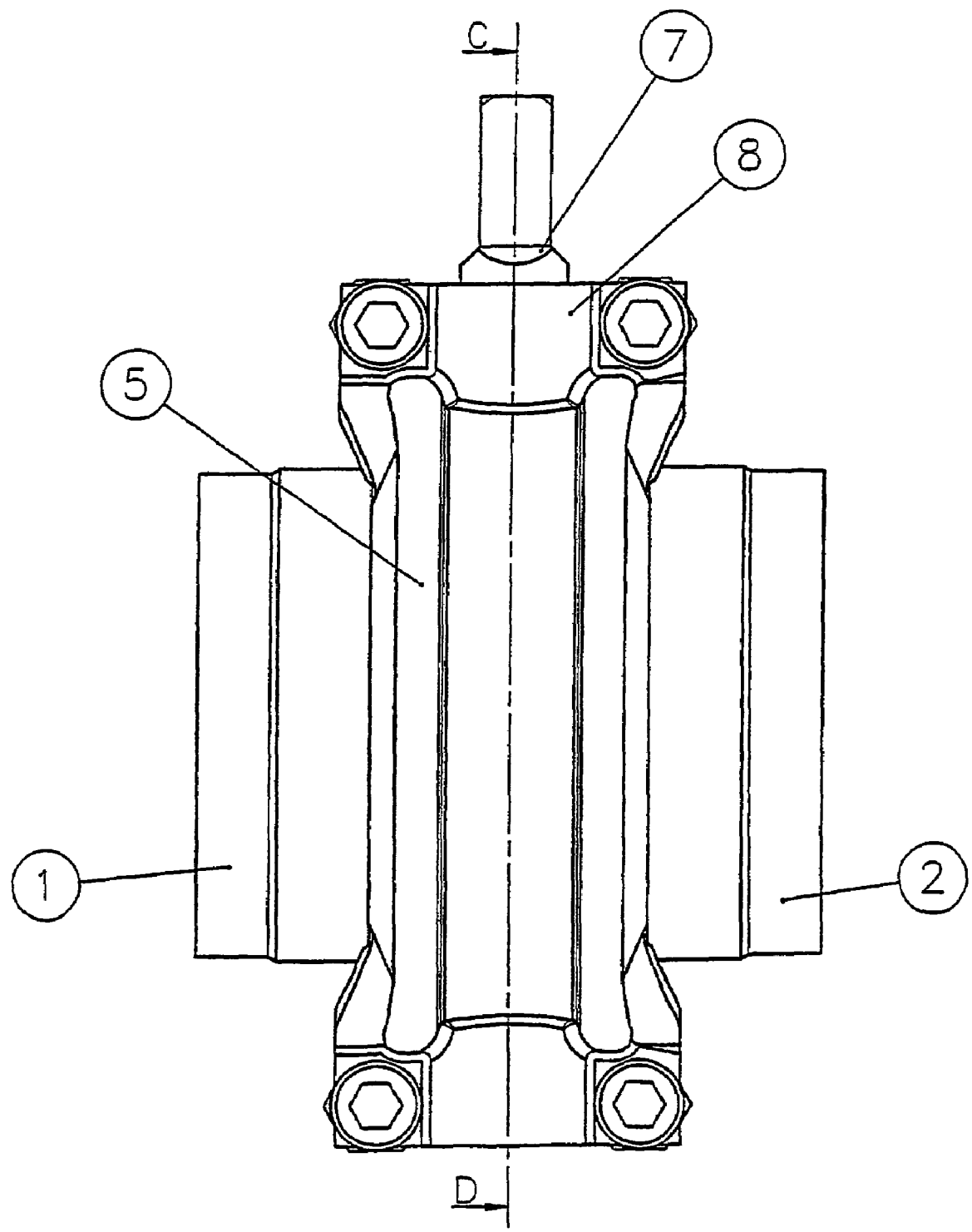

FIG. 4: side view of an assembled valve according to the invention

Figure 5:
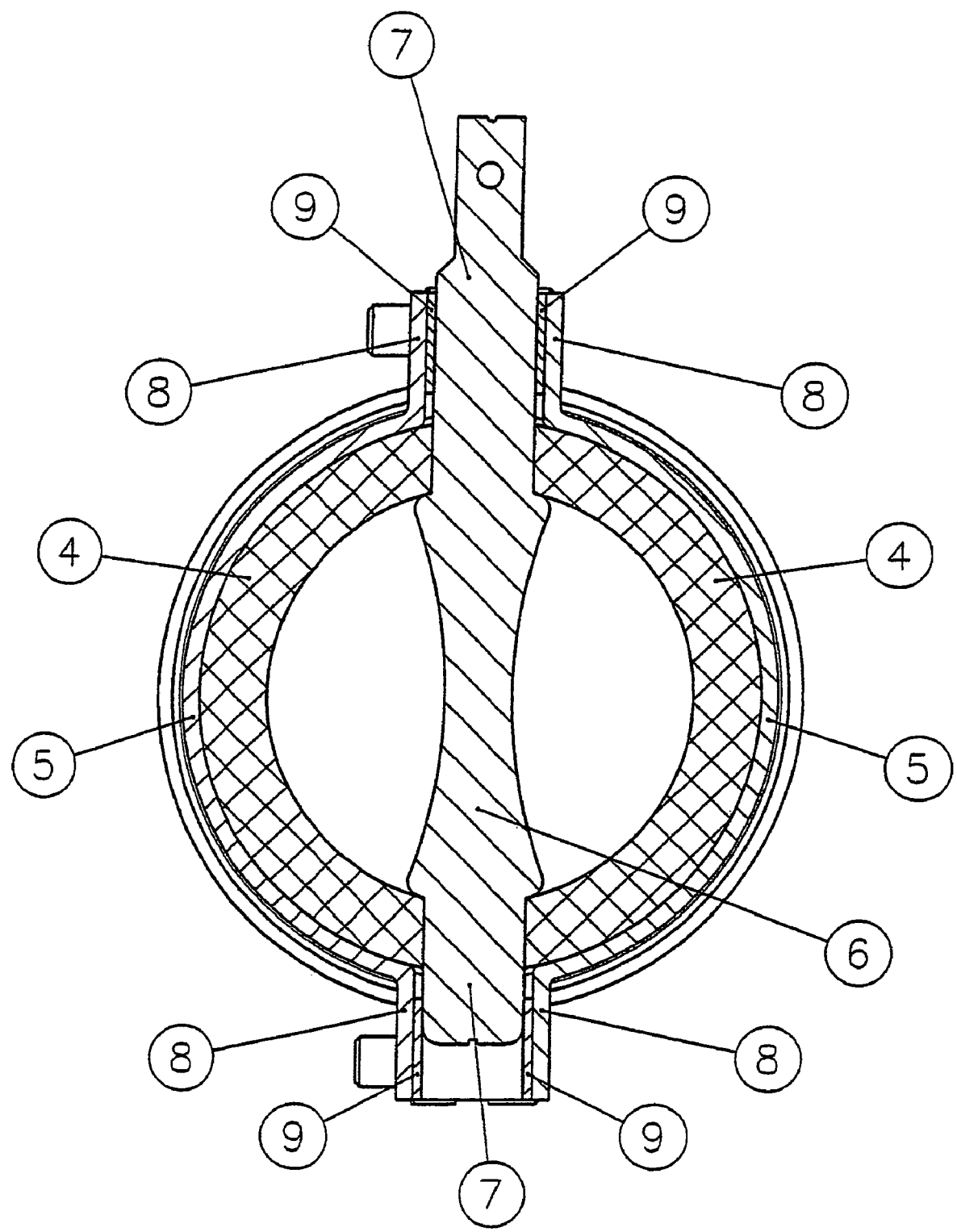

FIG. 5: cross-section along the line C-D of FIG. 4

Figure 6:
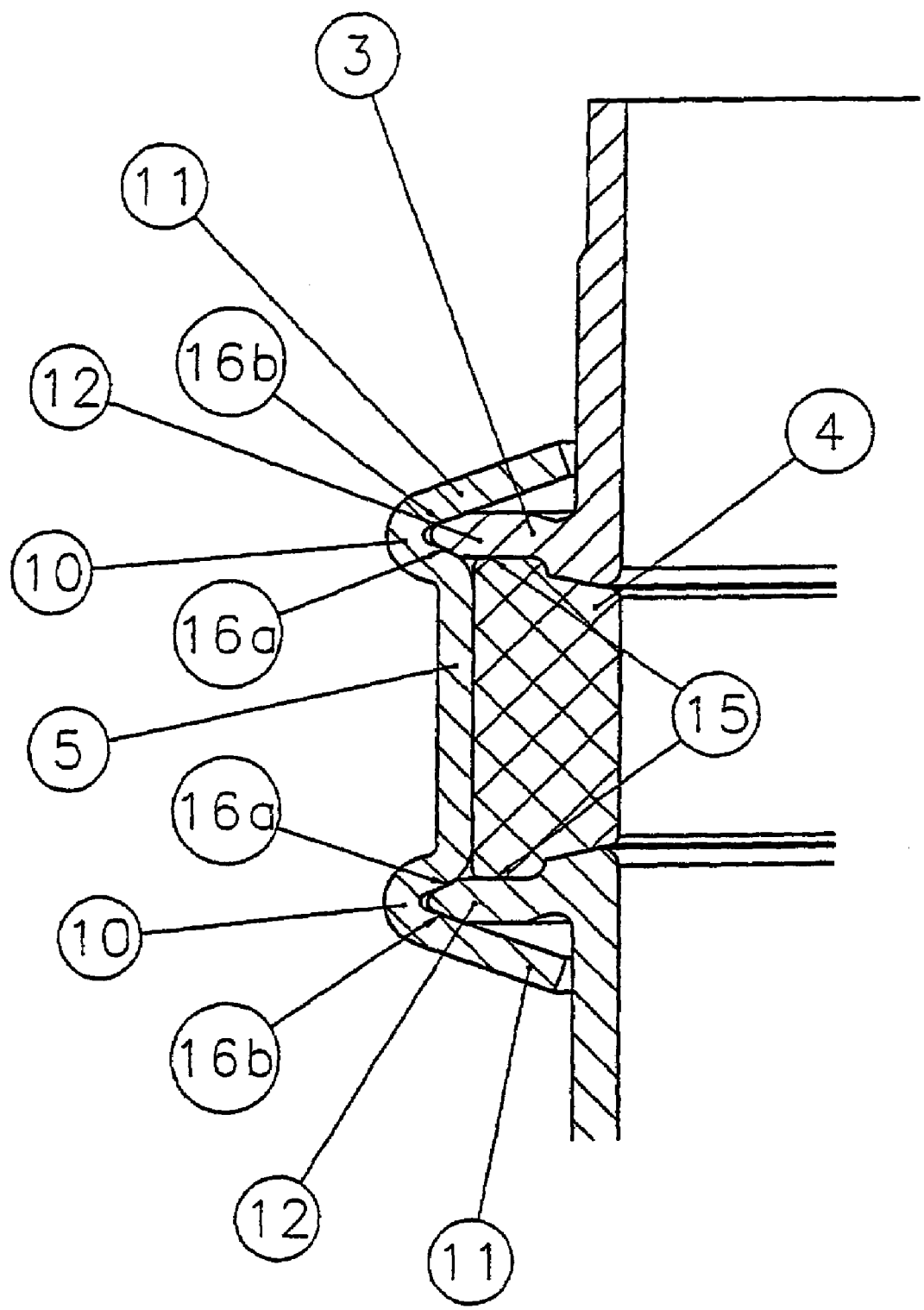

FIG. 6: enlargement of the detail of FIG. 3 labeled as E

FIG. 1 and FIG. 4 show overall views at a slant from above and from the side of a throttle flap valve according to the invention, respectively. As can be seen in the drawing, the valve is composed of a valve inflow 1 and a valve outflow 2. The valve inflow 1 as well as the valve outflow 2 are equipped with flanges 3, in each instance, the outside surfaces 15 of which are pressed axially against the rubber seal 4 with the clamp halves 5. The rubber seal 4 is affixed to the valve disk 6. The valve disk 6 is mounted in sleeves 9 inserted into the ring-shaped recesses 8 of the clamp halves 5, with the valve disk shafts 7.

As can be seen in FIG. 3 and FIG. 1, the clamp halves 5 are configured with two ring-shaped, concentric depressions 10 for accommodating the flanges 3, in each instance. The depressions 10 are beveled at the edges 11. The flanges 3 have a conical narrowing 12 towards the outside. The flanges 3 are in rigid contact with the clamp halves 5, at the inner and outer contact surfaces 16a and 16b, respectively, in each instance.

The clamp halves 5 are connected with screws 13 and nuts 14 to form a ring.

When axial forces that act from the system in the direction of the valve engage on the valve inflow 1, these forces are transferred to the clamp half 5 by way of the inner contact surface 16a of the flange 3 with the clamp half 5, and from there to the flange 3 of the valve outflow 2 by way of the inner contact surface 16a of the clamp half 5 with the flange 3. In this connection, the outer contact surface 16b generates the force that presses the flange 3 against the rubber seal 4, without any change.

When axial forces in the direction of the system, directed away from the valve, engage on the valve inflow 1, these forces are transferred to the clamp half 5 by way of the outer contact surface 16b of the flange 3 with the clamp half 5, and from there back to the flange 3 by way of the inner contact surface 16a of the clamp half 5 with the flange 3. The force that presses down on the rubber seal 4 remains constant in this connection.

When axial forces acting on the valve from the system in the direction of the valve engage on the valve outflow 2, these forces are transferred to the clamp half 5 by way of the inner contact surface 16a of the flange 3 with the clamp half 5, and from there to the flange 3 of the valve inflow 1 by way of the inner contact surface 16a of the clamp half 5 with the flange 3. In this way, the force that presses the flange 3 against the rubber seal 4 by means of the outer contact surface 16b is produced unchanged.

In both cases, according to the invention, the axial forces that act on the rubber seal 4 remain constant, in surprisingly simple manner, independent of the operating state of the system, and the rubber seal 4 is pressed together with a force that is exclusively dependent on the design of the clamp halves 5 and the rubber seal 4.

In a method for assembly of a throttle flap valve according to the exemplary embodiment, the rubber seal 4 is first set onto the valve disk 6.

Subsequently, the sleeves 9 are set onto the valve disk shafts 7 of the valve disk 6. It is possible to achieve rotating mounting of the valve disk shafts 7 with the sleeves 9, while simultaneously sealing the valve.

In the subsequent step, the valve disk 6 provided with the rubber seal 4 and the sleeves 9 is brought between the flanges 3, and subsequently the clamp halves 5 are laid around the flanges 3. In this connection, the depressions 10 of the clamp halves 5 are laid onto the flanges 3.

Now the valve disk shafts 7 of the valve disk 6 are oriented in any desired angle orientation. It is practical if a position is selected that guarantees good accessibility of the automatic setting drive of the hand wheel.

The clamp haves 5 are drawn together with the screws 13 and nuts 14, to press them against the rubber seal 4, until the flanges 3 are rigidly connected with the clamp halves 5, forming a positive lock. The flanges 3 then touch the clamp halves 5 at the inner and outer contact surface 16a and 16b, respectively. The clamp halves 5 have therefore been tightened until they make contact. Finally, a hand wheel or an automatic setting element is mounted on the valve disk shaft 7 of the valve disk 6.

Using this method, it is possible, in particularly advantageous manner, to replace the rubber seal 4 on location.

REFERENCE SYMBOL LIST 1 valve inflow
2 valve outflow
3 flange
4 rubber seal
5 clamp half
6 valve disk
7 valve disk shafts
8 ring-shaped recesses
9 sleeve
10 depressions
11 edges
12 conical narrowing
13 screw
14 nut
15 outer surfaces
16a inner contact surface
16b outer contact surface

The invention claimed is:

1. Throttle flap valve having an essentially ring-shaped, elastic seal element (4) that surrounds an axial opening, having a valve disk (6) disposed to rotate in the axial opening, crosswise to the axial direction, having means for turning the valve disk (6) between the open and the closed positions, to control a flow of fluid through the opening, having at least two valve housing parts (5) configured as two clamp halves (5) that essentially surround the seal element (4) in ring shape, which surround two flanges (3) connected with an inflow (1) and an outflow (2), the clamp halves having inner surfaces in contact with the seal element (4) comprising two ring-shaped depressions (10) surrounding the flanges (3), in each instance, wherein the depressions (10) are raised higher than the portion of the clamp halves in contact with the seal element (4), whereby conical contact surfaces of the flanges (3) and/or the valve housing parts (5) work together in such a manner that the flanges (3) are pressed axially against the seal element (4), forming a seal, by means of the valve housing parts (5), in the assembled state ready for operation, wherein the flanges (3) are rigidly connected with the valve housing parts (5), forming a positive lock, in each instance, and wherein the flanges (3) are shaped to have rotation symmetry.

2. Throttle flap valve according to claim 1, wherein the depressions (10) are beveled at the edges (11).

3. Throttle flap valve according to claim 1, wherein each flange is configured to narrow conically towards the outside.

4. Throttle flap valve according to claim 1, wherein the valve housing parts (5) are configured so that they can be connected with screws (13) and nuts (14).

5. Throttle flap valve according to claim 1, wherein the valve housing parts (5) are configured with two ring-shaped recesses (8) that lie radially opposite one another, for accommodating valve disk shafts (7) of the valve disk (6).

6. Throttle flap valve according to claim 1, wherein the means for turning the valve disk (6) is a hand wheel.

7. Throttle flap valve according to claim 1, wherein the means for turning the valve disk (6) is an automatic setting element.

8. Method for assembling a throttle flap valve according to claim 1, wherein in a first step, the seal element (4) is set onto the valve disk (6), wherein in a second step, sleeves (9) are set onto valve disk shafts (7) of the valve disk (6), wherein in a third step, the valve disk (6) provided with the seal element (4) and the sleeves (9) is placed between the flanges (3), wherein in a fourth step, the valve housing parts (5) are placed around the flanges (3), wherein in a fifth step, the valve disk shafts (7) of the valve disk (6) are oriented in a desired angle orientation, wherein in a sixth step, the adjustable means (13, 14) for applying contracting radial and axial forces to the sealing element (4) are adjusted until the flanges (3) are rigidly connected with the clamp halves (5), forming a positive lock, and wherein in a last step, the means for turning the valve disk (6) are affixed.

* * * * *